United States Patent
Liu et al.

(10) Patent No.: US 12,480,995 B2
(45) Date of Patent: Nov. 25, 2025

(54) SYSTEM AND METHOD FOR ECCENTRICITY SEVERITY ESTIMATION OF INDUCTION MACHINES USING A SPARSITY-DRIVEN REGRESSION MODEL

(71) Applicant: Mitsubishi Electric Research Laboratories, Inc., Cambridge, MA (US)

(72) Inventors: Dehong Liu, Cambridge, MA (US); Xiangtian Zheng, College Station, AL (US)

(73) Assignee: Mitsubishi Electric Research Laboratories, Inc.

( * ) Notice: Subject to any disclaimer, the term of this patent is extended or adjusted under 35 U.S.C. 154(b) by 209 days.

(21) Appl. No.: 18/045,099

(22) Filed: Oct. 7, 2022

(65) Prior Publication Data

US 2024/0133954 A1    Apr. 25, 2024

(51) Int. Cl.
  *G01R 31/34* (2020.01)
  *H02P 29/024* (2016.01)

(52) U.S. Cl.
  CPC .......... *G01R 31/343* (2013.01); *H02P 29/024* (2013.01)

(58) Field of Classification Search
  CPC ..... G01R 31/343; H02P 29/024; H02P 29/50; G01H 1/003; G01H 1/04; G01H 1/10;
  (Continued)

(56) References Cited

U.S. PATENT DOCUMENTS

| | | | | |
|---|---|---|---|---|
| 6,031,738 A | * | 2/2000 | Lipo | H02M 7/487 363/43 |
| 7,308,322 B1 | * | 12/2007 | Discenzo | G05B 23/0221 702/182 |

(Continued)

FOREIGN PATENT DOCUMENTS

WO    2021074248    4/2021

OTHER PUBLICATIONS

X. Zheng, H. Inoue, M. Kanemaru and D. Liu, "Eccentricity Severity Estimation of Induction Machines using a Sparsity-Driven Regression Model," 2022 IEEE Energy Conversion Congress and Exposition (ECCE), Detroit, MI, USA, 2022, pp. 1-6, doi: 10.1109/ECCE50734.2022.9947498. (Year: 2022).*

(Continued)

*Primary Examiner* — Catherine T. Rastovski
*Assistant Examiner* — Sharad Timilsina
(74) *Attorney, Agent, or Firm* — Gene Vinokur

(57) ABSTRACT

A fault detection system of eccentricity severity of an induction machine including a rotor and stator is provided. The fault detection system includes a sensor interface configured to acquire sensor signals from sensors arranged at predetermined positions of the induction machine, wherein the sensor signals are indicative of an eccentricity level of a rotor of the induction machine, a memory coupled with a processor. The memory stores training data sets and instructions implementing a learning-based fault detection method for the induction machine. The instructions include steps of generating an eccentricity feature matrix from the sensor signals, where in the sensor signals include load torque, rotor speed, vibration acceleration of the rotor, vibration speed of the rotor, and current spectral of the stator or the induction machine, determining an eccentricity level of the induction machine based on the eccentricity feature matrix (Continued)

using the learning-based fault detection method, wherein the learning-based fault detection method is configured to find the eccentricity level from learning-based eccentricity feature matrix data sets.

10 Claims, 12 Drawing Sheets

(58) Field of Classification Search
CPC .... G01H 1/12; G01M 13/028; G01M 13/045; G01M 99/005; G01M 99/008; G01B 7/312
See application file for complete search history.

(56) References Cited

U.S. PATENT DOCUMENTS

| | | | |
|---|---|---|---|
| 11,411,521 B2 | 8/2022 | Zhou et al. | |
| 2009/0037121 A1* | 2/2009 | Muralidharan | F01D 25/285 73/462 |
| 2015/0276823 A1* | 10/2015 | Rodriguez | G01R 23/00 702/75 |
| 2017/0364800 A1* | 12/2017 | Kiranyaz | G06N 3/084 |
| 2020/0182684 A1* | 6/2020 | Yoskovitz | G01R 33/02 |
| 2020/0348207 A1* | 11/2020 | Wang | H02H 3/50 |
| 2023/0260332 A1* | 8/2023 | K | G07C 5/0808 701/31.4 |

OTHER PUBLICATIONS

Wang et al. A non intrusive multi parameter fault diagnosis system for industrial machineries, 2018 IEEE 24th International Conference on Parallel and Distrubuted Systems, Dec. 11, 2018.

J. Faiz and S. Moosavi, "Eccentricity fault detection-from induction machines to DFIG—a review," Renewable and Sustainable Energy Reviews, vol. 55, pp. 169-179, 2016.

M. Drif and A. M. Cardoso, "Airgap-eccentricity fault diagnosis, in three-phase induction motors, by the complex apparent power signature analysis," IEEE Transactions on industrial electronics, vol. 55, No. 3, pp. 1404-1410, 2008.

J. Petryna, A. Duda, and M. Sulowicz, "Eccentricity in induction machines—a useful tool for assessing ts level," Energies, vol. 14, No. 7, p. 1976, 2021.

* cited by examiner

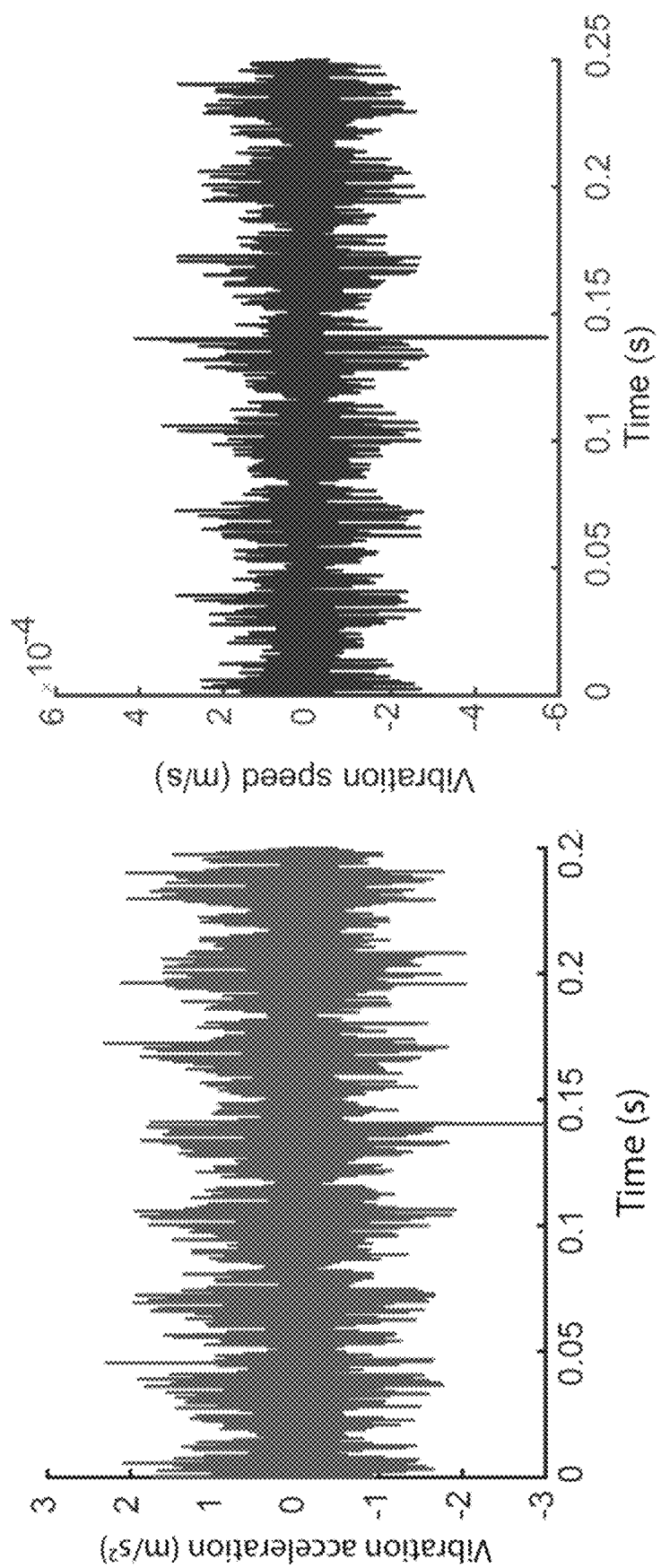

Algorithm 1: ADMM for regularized linear regression model

Input: $X_T, y_T, \alpha, \rho, n_{iter}$;
Initialization: $z \leftarrow z_0, \mu \leftarrow \mu_0$;
for $j = 1, \ldots, n_{iter}$ do
$\quad w_j \leftarrow \arg\min_w \mathcal{L}(w, z_{j-1}, \mu_{j-1})$;
$\quad z_j \leftarrow \arg\min_z \mathcal{L}(w_j, z, \mu_{j-1})$;
$\quad \mu_j \leftarrow \mu_{j-1} + w_j - z_j$;
end
Output: $w_T = w_{n_{iter}}$.

FIG. 9

SYSTEM AND METHOD FOR ECCENTRICITY SEVERITY ESTIMATION OF INDUCTION MACHINES USING A SPARSITY-DRIVEN REGRESSION MODEL

FIELD OF THE INVENTION

The present invention is related to a system for eccentricity severity estimation, and more particularly to the machine learning and artificial intelligence adapted for the estimation of a level of severity of eccentricity of induction motors.

BACKGROUND & PRIOR ART

Eccentricity is a common issue in induction machines or other type of motors which may be caused by imperfection of manufacturing processes or long-time operations. When there exists eccentricity, the air gap between the stator and the rotor is not equally distributed, causing fluctuating torque and undesired vibrations. Even worse, it may lead to insulation damage or sudden failure during operations. Therefore, it is of great importance to detect eccentricity and estimate eccentricity severity for preventive maintenance.

Over the past decades, motor eccentricity detection has attracted great attention in the motor fault detection community. The most commonly used invasive method for eccentricity diagnosis is motor current signature analysis (MCSA), which aims to detect characteristic frequency components in the spectrum with respect to a certain type of eccentricity. Besides MCSA, the spectrum of the instantaneous real and reactive power has been utilized for motor eccentricity detection, where the ratio between the amplitude of the rotational frequency-dependent characteristic component and the DC component is defined as a fault signature. Other methods such as magnetic field-based eccentricity detection are also explored, which aim to examine the magnitude of characteristic harmonics via analyzing the spectrum of the stray flux.

These methods are mostly used for detecting the presence of eccentricity and are inaccurate or impractical for estimating the severity of eccentricity. However, knowing the severity of eccentricity can be beneficial to the cost-effective maintenance of the inductive motors and their control.

Accordingly, there is a need for estimating the level of severity of eccentricity of induction motors.

SUMMARY OF THE INVENTION

It is an object of some embodiment to provide a system and a method suitable for estimating not only the presence or absence of eccentricity in the induction motors but also the level of severity of the eccentricity. Additionally or alternatively, it is an object of some embodiments to estimate different levels of eccentricity from the motor current spectrum and/or other measurements indicative of the state of the operation of the induction motor. Additionally or alternatively, it is an object of some embodiments to estimate different levels of the eccentricity of the induction motor under different load conditions.

Some embodiments are based on understanding that to estimate different levels of the eccentricity of the induction motor there is a need for a model connecting measurements of the state of the operation of the motor with the level of eccentricity. Such a model can be determined based on the analysis of the dynamics of the induction motor. However, such a model would suffer from uncertainties in both the quality of the measurements of different parameters of operation and the relationships among the parameters. For example, if the model relates measurements of different harmonics of the current for a specific load moved by the motor, the relationships between the measurements of different harmonics for the current and other loads are at least partially unknown. In addition, the measurements themselves are subject to noise. These may not be a problem when the objective is to determine the presence or absence of eccentricity. However, these uncertainties may make the severity level estimation inaccurate or even impractical.

Some embodiments are based on a recognition that the cause of the problem of these inaccuracies lies at least in part in the unknown relationship of the noise in the measurements of the parameters of operation. Indeed, when the measurements of the parameters of the operation of the motor are not precisely known and their effect on the severity of the eccentricity is uncertain, the noise of different measurements and their relationships is usually added together as one total noise affecting the model. However, this approach leads to amplification of the individual noise of each measurement by the uncertainty of the relationships between the measurements leading to a reduction of the signal-to-noise ratio (SNR) in the estimation of the severity level of the eccentricity.

Some embodiments are based on a realization that a structure of the data-driven model can be predetermined to address the problem of noise accumulation while specific coefficients of that structure can be learned from data. For example, some embodiments determine the model of the severity of the eccentricity as a weighted combination of measurements of the parameters of operation of the induction motor where the weights of the weighted combination are learned from training data with machine learning. Such a structure of the model is advantageous because deals with the uncertainty of each measurement individually. Indeed, the weights learned with machine learning can incorporate not only the contribution of each measurement in the estimation of the level of severity but also the uncertainty of the measurement.

In addition, fixing the structure of the model as a weighted combination limits the non-linearity of the mutual relationship of different measurements. However, the potential mutual effect of different measurements on each other remains uncertain. To address this problem, some embodiments follow the principles of physics-informed machine learning to steer the learning process towards identifying physically consistent solutions. For example, because the structure of the model allows for considering each measurement individually, some embodiments use machine learning subject to sparsity constraints. Doing in such a manner preserves only the measurements with the dominant connection to the eccentricity thereby reducing the number of uncertain mutual relationships among different measurements while preserving the statistical distribution of the model trained with machine learning.

For example, let's say an eccentricity estimation system receives measurements of 10 different parameters of operation of an induction motor. If the weights of the weighted combination of the model relating the severity of the eccentricity to the measurement according to some embodiments would be learned with machine learning without sparsity constraints, the level of eccentricity would be determined as a weighted combination of 10 measurements. However, if the sparsity constraints are enforced during the training, maybe only three weights would have a non-zero value. As a result, the noisy contribution of different measurements can be reduced and/or avoided.

The benefit of using machine learning with sparsity constraints can be further analyzed from the point of view of the machine learning itself. When faced with the task of learning the weights for the proposed model, even if having unlimited labeled training data (which is rarely the case), machine learning may learn weights that are not entirely accurate to estimate the severity level with a target accuracy. The reason is that the training data for machine learning is different from the input data measured during the operation of the induction motor. Hence, machine learning relies on the hope that the statistical distribution of measurements used for machine learning the weights resembles the statistical distribution of the measurements collected during the operation of the motor. Hence, it becomes important what kind of measurements are used for machine learning and severity estimation because this statistical relationship should be stable. While this statistical relationship is generally unknown in advance, enforcing sparsity constraints during machine learning allows for eliminating the noisy contribution of different measurements. These noise contributions usually disturbed the statistical relationship between training and testing data. Thereby, by removing them from the model, the accuracy of severity estimation is improved. As a result, a single set of weights can be used by some embodiments for determining different eccentricity levels.

In addition, the evaluation of the model during the operation of the motor is simplified, because only three measurements in this example would contribute to the model while 10 different measurements are considered to form the weights for combining these 3 measurements. Further, this principle can be used as a test for verifying whether the weights are learned with machine learning subject to sparsity constraints or not. This is because the 3 weights learned with sparsity constraints from training data including measurements of 10 parameters would be different from weights learned from measurements of corresponding 3 parameters without the sparsity constraints.

According to some embodiments of the present invention, a fault detection system is provided for estimating eccentricity severity of an induction machine including a rotor and stator. The fault detection system may include a sensor interface configured to acquire sensor signals from sensors arranged at predetermined positions of the induction machine, wherein the sensor signals are indicative of an eccentricity level of a rotor of the induction machine; a memory coupled with a processor, wherein the memory stores instructions implementing a learning-based fault detection method for the induction machine, wherein the instructions, when executed by the processor, carry out at steps of: generating an eccentricity feature matrix by extracting the sensor signals via the sensor interface, wherein the sensor signals include at least one of load torque, rotor speed, vibration acceleration of the rotor, vibration speed of the rotor, and current spectra of the stator; and determining the eccentricity level of the induction machine based on the eccentricity feature matrix using the learning-based fault detection method, wherein the learning-based fault detection method has been trained to find the eccentricity level from the learning-based eccentricity feature matrix data sets.

Further, some embodiments can provide an apparatus for estimating a severity level of an eccentricity of an induction motor. The apparatus may include an input interface configured to accept values of a set of parameters of a state of an operation of the induction motor at different time steps via a network; a memory configured to store a set of weights learned for the set of parameters of the operation of the induction motor from training data with machine learning subject to sparsity constraints; a processor configured to determine the severity level as a weighted combination of the values of the set of parameters accepted at a time step and weighted with corresponding weights retrieved from the memory, wherein the processor uses the same weights for the set of parameters accepted at the different time steps; and an output interface configured to render the determined severity level.

Yet further, some embodiments can provide an artificial intelligence (AI) training system for learning the weights stored in the memory of the apparatus mentioned above. The AI training system may include a training processor; and a training memory having instructions stored thereon that cause the training processor to: collect training data indicative of measurements of a plurality of parameters including the set of parameters paired with a labeled value of the severity level; train the set of weights for the weighted combination of the plurality of parameters reducing a loss function including a difference of a severity level estimated with current weights and the labeled value subject to the sparsity constraints; and submit the weights to the apparatus of claim 1 over one or a combination of wired and wireless communication channels.

BRIEF DESCRIPTION OF THE DRAWING

The accompanying drawings, which are included to provide a further understanding of the invention, illustrate embodiments of the invention and together with the description serve to explain the principle of the invention. The drawings shown are not necessarily to scale, with emphasis instead generally being placed upon illustrating the principles of the presently disclosed embodiments.

FIG. 4A and FIG. 4B are exemplar plots of time-domain stator current and the corresponding frequency spectrum, respectively;

FIG. 9 shows an algorithm of a method for training the regression model of the induction motor according to another embodiment of the invention;

DETAILED DESCRIPTION OF THE PREFERRED EMBODIMENTS

Figure 1A:
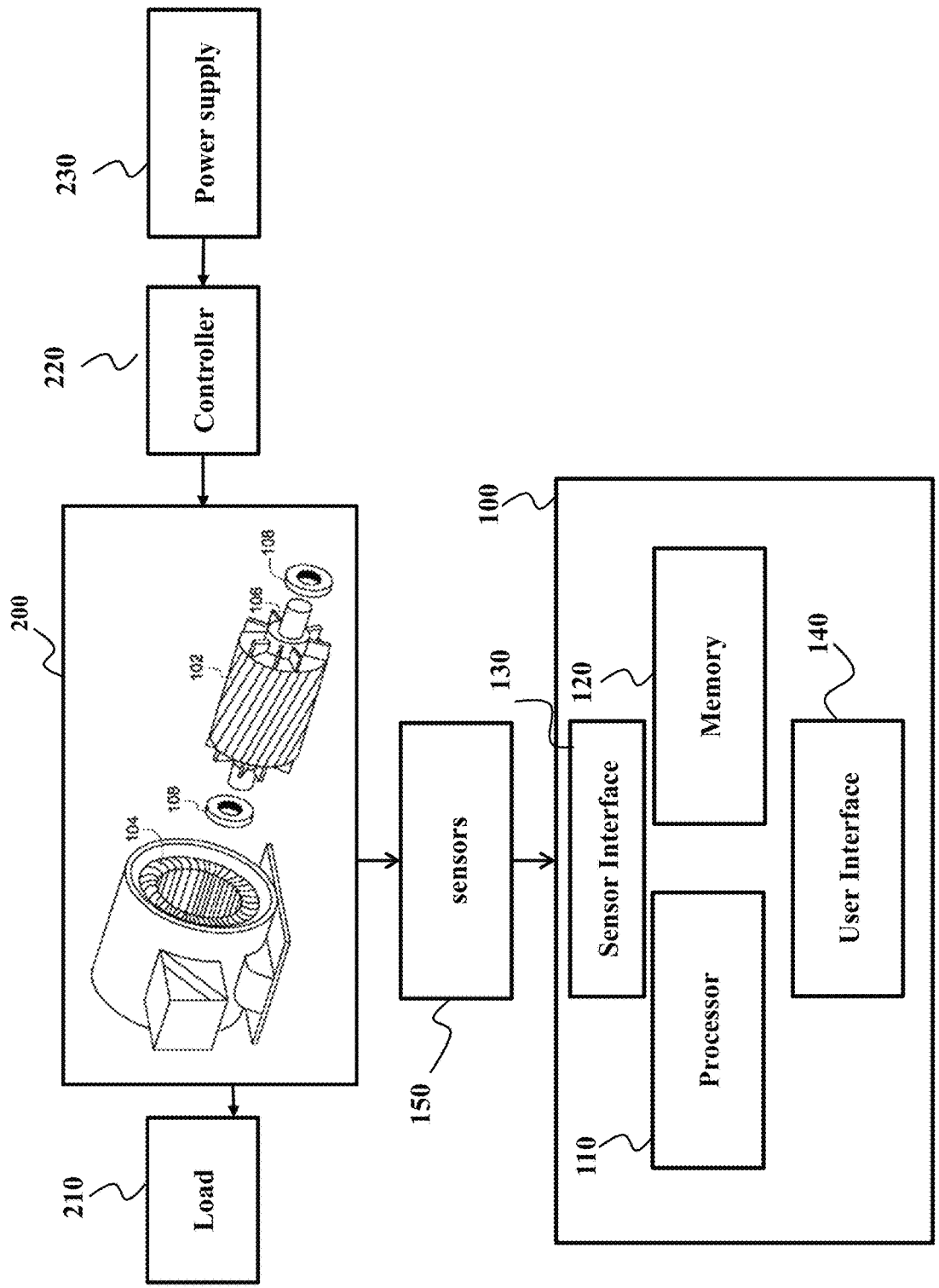
FIG. 1A is a schematic of a fault severity detection system for controlling and monitoring an induction motor according to one embodiment of an invention.

Various embodiments of the present invention are described hereafter with reference to the figures. It would be noted that the figures are not drawn to scale elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiments of the invention.

FIG. 1A is a schematic of a fault severity detection system 100 for controlling and monitoring an induction motor according to one embodiment of an invention.

The induction motor (system) 200 includes a rotor assembly 102, a stator assembly 104, a main shaft 106, and two main bearings 108. In this example, the induction motor 200 is a squirrel-cage induction motor.

The controller 220 is powered by power supply 230 and can be used for monitoring and controlling the operation of the induction motor 200 in response to various inputs in accordance with embodiments of the present invention. For example, the controller 220 connected to the induction motor 200 can control the speed of the induction motor based on inputs received from the fault detection system 100 configured to acquire data pertaining to operating conditions of the induction motor 200 from the sensors 150. According to certain embodiments, the electrical signal of the sensors 150 can be current and voltage sensors for acquiring current and voltage data pertaining to the induction motor 200. For example, the current sensor senses current data from one or more of the multiple phases of the induction motor. More specifically, in the case of the induction motor is a 3-phase induction motor, the current and voltage sensors sense the current and voltage data from the three phases of the 3-phase induction motor. While certain embodiments of the present invention will be described with respect to a multi-phase induction motors, other embodiments of the present invention can be applied to other multi-phase electromechanical machines.

Some embodiments of the present invention describe a system for fault detection in an electric machine, such as the induction motor 200. The system configured for detection includes a fault-detection module 100 for detecting the presence and severity of a faulty condition of a rotor 102, including eccentricity fault, within the induction motor assembly. In one embodiment, the fault detection module 100 is implemented as a sub-system of the controller 220. In alternative embodiment, the fault-detection module 100 is implemented using a separate processor. The fault-detection module 100 may be a hardware circuit module that is operatively connected to the controller 220. In some implementations the fault-detection module 100 and the controller 220 can share the information. For example, the fault detection module 100 can reuse sensor data used by the controller to control the operation of the induction motor.

Further, the fault-detection module 100 includes a processor 110, a memory 120, a fault detection program stored in the memory 120 when the instructions of the program are performed by the processor 110. The module 100 further includes a sensor interface 130 configured to acquire signals from the sensors 150. The interface 130 includes A/D (analog/digital) and A/D (analog/digital) coverts to perform data communication with the processor110, the memory 120, the fault detection program, a user interface 140 and the sensors 150. The processor 110 may be multiple processors, and the memory 120 may be a memory module that includes multiple memories. The user interface 140 is configured to connect to a keyboard and a display unit configured indicate the normal/fault status information of the induction motor 200 in response to the output of the fault-detection module 200.

The presence of the eccentricity fault in the induction motor 200 leads to fluctuation in the torque of the rotor thus leading to vibration of the induction motor 200.

In some cases, some embodiments of the present invention provide an apparatus for estimating a severity level of an eccentricity of an induction motor. In this case, the apparatus is configured to include an input interface configured to accept values of a set of parameters of a state of an operation of the induction motor in the form of a feature matrix at different time steps via a network, a memory configured to store a set of weights learned for the set of parameters of the operation of the induction motor from training data with machine learning subject to sparsity constraints. The apparatus also includes a processor configured to determine the severity level as a weighted combination of the values of the set of parameters accepted at a time step and weighted with corresponding weights retrieved from the memory, wherein the processor uses the same weights for the set of parameters accepted at the different time steps, and an output interface configured to render the determined severity level.

Figure 1B:
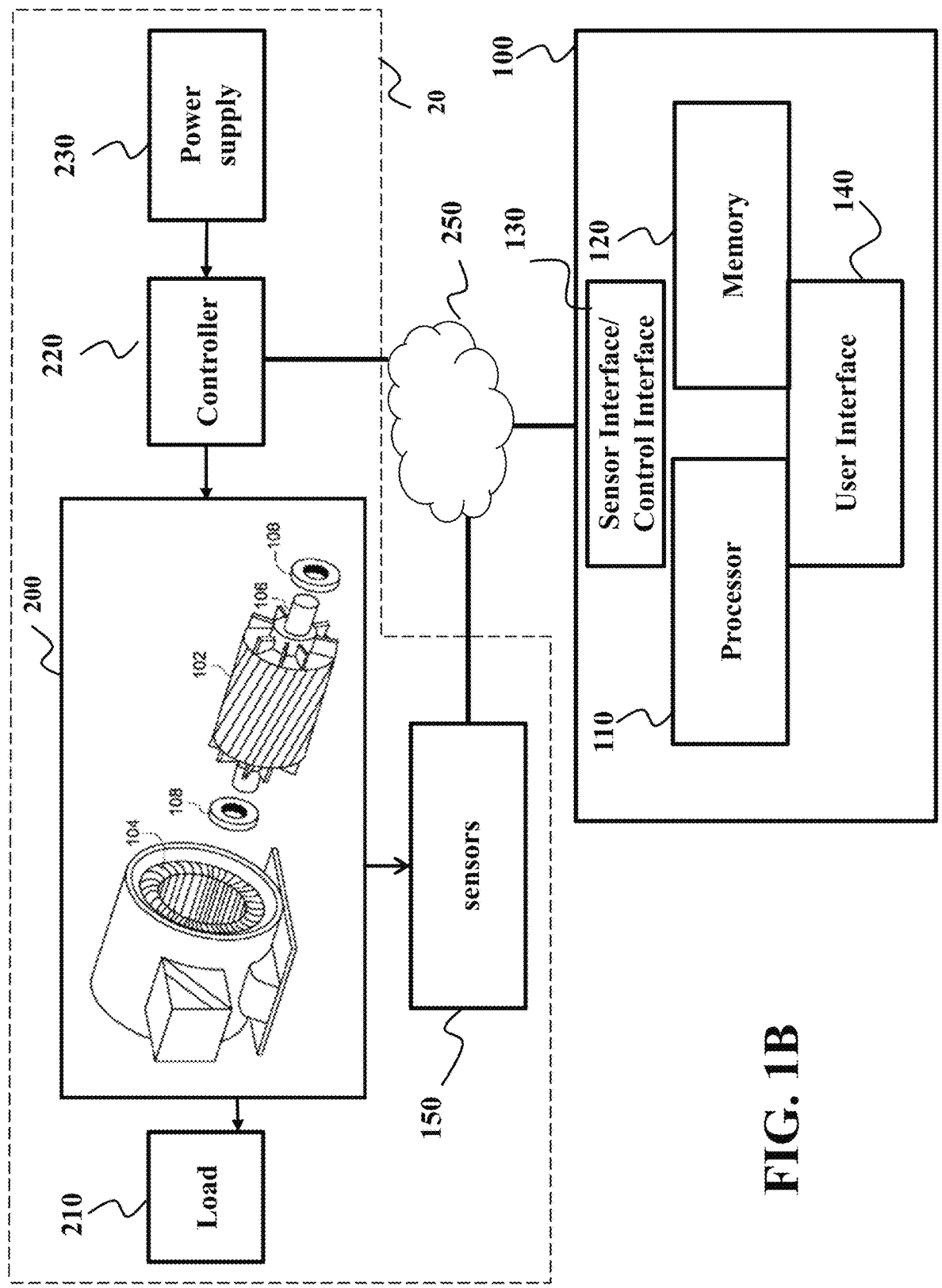
FIG. 1B is a schematic of a fault severity detection system operated by a user (operator) via a network for controlling and monitoring an induction motor according to one embodiment of an invention.

FIG. 1B is a schematic of a fault severity detection system operated by a user (operator) via a network 250 for controlling and monitoring an induction motor according to one embodiment of an invention. In this case, the fault-detection module 100 may be included in an operating system of induction motors located at the site of the user/operator. When the fault-detection module 100 determines that a fault is caused based on the sensor signals of the sensors 150 via the network (communication network) 250 during the operation of the induction machine (induction motor) 200, the fault-detection module 100 can transmit a control signal via the network 250 to slow down or stop driving the induction motor 200 based on a preprogrammed algorithm (not shown in the figure) stored in the memory 120. In some cases, the calibrations of the sensors 150 can be performed based on the sensor calibration program (not shown in the figure) stored in the memory of fault-detection module 100. In some cases, the network 250 may be an optical fiber network, a wireless network, an internet network, or a data communication network consisting of at least two combinations among the optical fiber network, the wireless network, and the internet network.

This configuration can be a maintenance system managed by a user/client, who operates the induction machine system 20 separately located from the site of the induction machine. For instance, this system configuration can be used for a power generating system operated by a user, and a train system for controlling the induction motors driving the trains. In some cases, when the fault-detection module 100 detects a site of the induction machine is separated from a site of the fault detection system, the data communication between the site of the induction machine and the site of the fault detection system is performed via a network. The network 250 may be an optical fiber network, a wireless network, an internet network, or a data communication network consisting of at least two combinations among the optical fiber network, the wireless network, and the internet network.

Further, the fault detection system is included as part of a maintenance system of a user. When the determined eccentricity level of the induction machine is equal to or greater than a critical threshold level, the fault detection system transmits a control signal to a controller of the induction machine via a network using the sensor interface/control interface 130 to stop operating the induction machine.

In one embodiment of the invention, the current and voltage sensors respectively detect stator current data from the stator assembly 104 of the induction motor 200. The current data and voltage data acquired from the sensors is communicated to the inverter and/or the fault detection module for further processing and analysis. The analysis includes performing motor current signature analysis (MCSA) to detect faults within the induction motor 200. In some embodiments, upon detecting the fault by using the fault-detection module 100, the controller 220 receives a fault detection signal via the interface 130 of the fault-detection module 100 stops the operation of the induction motor by transmitting an interrupting signal of the stator current of the induction motor 200 to the controller 110 for further inspection or repair. In some cases, the sensors 150 may include a controller interface (not shown) that is configured to receive the fault detection signal from the interface 130 and transmit the fault state signal to the controller 220 such that the controller 220 interrupts the stator current of the induction motor 200 for stopping the operations of the induction motor 200. When the sensor 150 does not include the controller interface, the interface 130 may be configured to connect to the controller 220 such that the controller interrupts the stator current of the induction motor 200 for stopping the operations of the induction motor 200 in response to the fault detection signal from the fault-detection module 100 via the interface 130.

The system also includes a memory for storing the measurements of the signal and various parameters and coefficients for performing a fault severity detection method.

Some embodiments of the present invention are based on recognition that the motor eccentricity detection is one of important techniques for motor fault detection. The most used invasive method for eccentricity diagnosis is motor current signature analysis (MCSA), which aims to detect characteristic frequency components with respective to a certain type of eccentricity in the frequency spectrum.

For most induction machines with eccentricity fault, the signature frequency in the current signal is $$f_{ecc} = \left((kR \pm n_d)\frac{1-s}{p} \pm v\right)f_s, \qquad (1)$$

where $f_s$ is the fundamental supply frequency, R is the number of rotor slots, s is the slip, p is number of pole pairs, k is any positive integer, $n_d$ is the eccentricity order ($n_d$=0 in case of static eccentricity and $n_d$=1,2,3, . . . , in case of dynamic eccentriciy), and v is the order of stator time harmonics. Without the number of rotor slots, a simplified version is given by $$f_{ecc} = \left[1 \pm m\left(\frac{1-s}{p}\right)\right]f_s = f_s \pm mf_r, \qquad (2)$$

where $$f_r = \frac{1-s}{p}f_s$$

is the rotor frequency related to the rotational speed.

Besides the conventional MCSA-based methods, researchers also explored signatures including higher order current harmonics, vibrations, stator voltage and current Park's vector, torque, etc. For example, for principal slot harmonic (PSH) type induction machines, who have a combination of pole pair number p and rotor slot number R that satisfy R=2p[3(m±q)±r], where m±q=0,1,2, . . . and r=0,1, the conventional MCSA-based method does not work well since there is no significant dependency between current signals and the eccentricity level. To deal with this issue, a frequency component $$R\left(\frac{1-s}{p}+1\right)f_s$$

can be used for the detection of static eccentricity level.

Other methods such as the magnetic field-based eccentricity detection are also explored, which aim to examine the magnitude of characteristic harmonics via analyzing the spectrum of the stray flux. However, they are not widely accepted due to the costly installation of sensors. In contrast to the binary eccentricity detection problem, eccentricity severity estimation is more challenging due to its complexity and the influence of operating conditions. Although a current spectrum-based indicator is proposed to qualitatively assess the eccentricity level, there is no clear standardized criteria for quantitative estimation, especially under varying operating conditions.

Figures 2A, 2B, 2C:
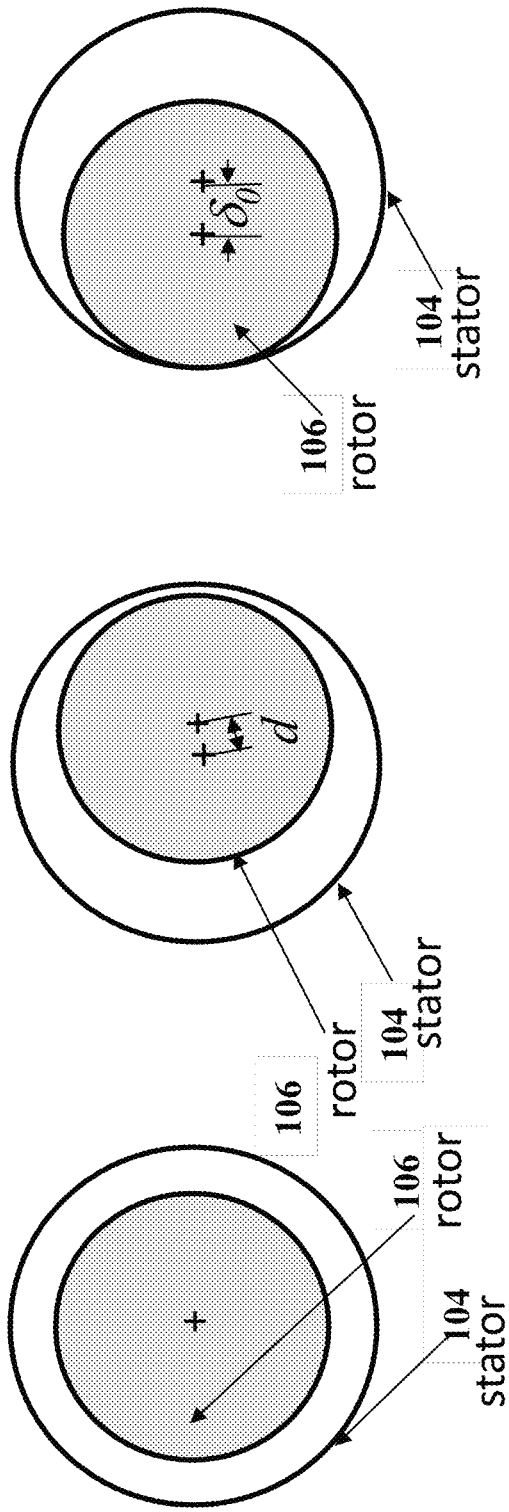
FIG. 2A, FIG. 2B, and FIG. 2C are diagrams of eccentricity severity level indicated by relative air gap according to one embodiment of the invention.

FIG. 2A, FIG. 2B, and FIG. 2C are diagrams of eccentricity severity level indicated by relative air gap according to one embodiment of the invention.

Based on our physical model of induction machines and fault detection methods using different features, we aim to estimate eccentricity severity of induction machines by a learning-based method incorporating different eccentricity related features.

Assume that we have N experiments conducted under different eccentricity levels and various load conditions. For each experiment, we obtain the eccentricity level, the load condition in torque, and multiple measurement time series including rotating speed, vibration acceleration, and three-phase current. By processing the measured data, we can obtain a feature matrix $X \in R^{N \times M}$ of parameters of a state of an operation of the induction motor and a corresponding vector $y \in R^{N \times 1}$ of eccentricity levels represented by $$i. X=[x_1, \ldots, x_M], \qquad (3)$$

$$ii. y=[y_1, \ldots, y_N]^T, \qquad (4)$$

where $x_i \in R^{N \times 1}$ (i=1, . . . , M) corresponds to the $i^{th}$ feature and $y_j \geq 0$ (j=1, . . . , N) is the eccentricity level of the induction machine in the $j^{th}$ experiment defined by $$y_j = \frac{d_j}{\delta_0} \times 100\%, \quad (5)$$

where $d_j$ is the distance between the actual rotor axis and the stator axis, and $\delta_0$ is the average air gap length in the corresponding healthy motor. For ideal healthy induction machines, the rotor and the stator are coaxial, therefore $d_j=0$. Further, the definition of the eccentricity level y is described as $y=d/\delta_0 \times 100\%$, and illustrated in FIG. 2B.

These feature values in X can be referred to as a set of parameters of a state of an operation of the induction motor.

We model the eccentricity level as a function of operating conditions such as load, rotating speed, and vibration, i.e., as well as the current spectral feature $$y = Xw + b + u, \quad (6)$$

where $w=[w_1, \ldots, w_M]^T \in R^{M \times 1}$ is a weight vector, $b \in R^{N \times 1}$ is a bias term, and $u \in R^{N \times 1}$ represents error.

To determine the feature weight vector w, we use training data set $\{y_T, X_T\}$ to learn our model parameters. Note that we only have limited data with a number of discrete eccentricity levels in y. To avoid overfitting, we use a regularizer term on w and formulate the regression problem as an optimization problem $$w_T = \text{argmin}_w \frac{1}{2} \|y_T - X_T w - b\|_2^2 + \alpha \|w\|_1, \quad (7)$$

where $\alpha$ is a pre-defined coefficient of the regularization term, $b = \bar{y}_T 1$ with $\bar{y}_T$ the mean value of $y_T$, and $\|w\|_1 = \Sigma_{i=1}^M w_i$ represents the $l_1$ norm of w. By minimizing the $l_1$-norm regularized objective function, we achieve a sparse solution of w that fits the regression model. Since w is sparse, meaning only a few non-zero coefficients in w, the corresponding features play important roles in determining the eccentricity level.

To solve (7), we consider the augmented-Lagrangian scheme with penalty parameter $\rho$ and variable $\mu$ $$\mathcal{L}(w, z, \mu) = \frac{1}{2} \|y_T - X_T w - \bar{y}_T 1\|_2^2 + \alpha \|z\|_1 + \frac{\rho}{2} \|w - z + \mu\|_2^2 \quad (8)$$

We then iteratively update w, z, and $\mu$ using the alternating direction method of multipliers (ADMM). The detailed updating process is summarized in FIG. 8.

Note that in each iteration, $w_j$ has a closed-form solution which can be computed efficiently as $$w_j = (X_T^T X_T + \rho E^T E)^{-1} [X_T^T (y_T - \bar{y}_T) + \rho E^T (z_{j-1} - \mu_{j-1})], \quad (9)$$

where $E \in R^{N \times N}$ is an identity matrix, and $z_j$ can be solved by a soft-thresholding process as $$z_{j,i} = \begin{cases} E_i w_j + \mu_{j,i} - \frac{\alpha}{\rho} & \text{if } E_i w_j + \mu_{j,i} \geq \frac{\alpha}{\rho} \\ E_i w_j + \mu_{j,i} + \frac{\alpha}{\rho} & \text{if } E_i w_j + \mu_{j,i} \leq -\frac{\alpha}{\rho}, \\ 0 & \text{otherwise} \end{cases} \quad (10)$$

where $z_{j,i}$ and $\mu_{j,i}$ are the $i^{th}$ element of $z_j$ and $\mu_j$, respectively, and $E_i$ is the $i^{th}$ row vector of E. Once we have learned weight vector $w_T$, we can estimate the eccentricity severity level using $$y_t = min(max(X_t w_T + \bar{y}_T 1, 0), 1) \quad (11)$$

with test data feature $X_t$.

Figure 3:
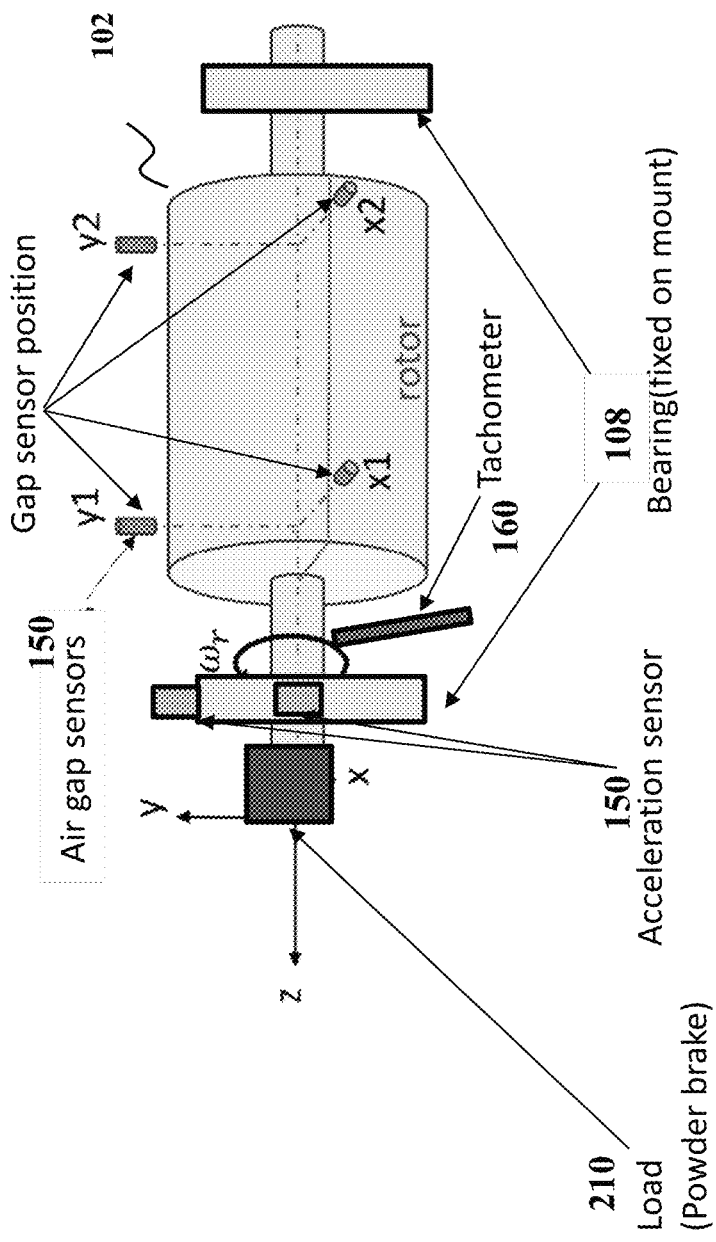
FIG. 3 is an exemplar picture and illustration of an induction motor controlling and monitoring system.

FIG. 3 shows a diagram illustrating an exemplar setup of eccentricity severity level estimation of an induction machine. To produce different eccentricity levels, the two original bearings 108 between the rotor 102 and the stator 104 are taken out. Instead, two larger external bearings are used to support the rotor such that the motor's static eccentricity level can be manually adjusted within a certain range with high accuracy. A magnetic powder brake, whose torque can be tuned by changing its input operating current, is used as the load 210. The whole motor drive system is enclosed in a clear cage for safety purpose. During operation, multiple sensors 150 are used to record synchronized time-sequence data: i) one tachometer 150 measures the rotating speed, ii) two accelerometers 150 record the motor vibration along horizontal and vertical directions respectively, and iii) three current probes 150 connected to the terminals of the stator 104 records the three-phase stator current accordingly.

Experiments are conducted under various conditions of eccentricity level and load by adjusting the external bearings and the input operating current of the magnetic powder brake. For each experiment, given a pair of eccentricity level and load, we follow three steps: i) shift the bearings that support the rotor to the eccentricity level under stationary state, ii) set the input current of the magnetic powder brake to provide desired load torque, and iii) start the motor and record data when the motor is running in steady status.

Specifically, we examine 5 different eccentricity levels in percentage as $y_j \in \mathcal{Y} = \{0\%, 11\%, 25\%, 43\%, 56\%\}$ and 8 different load conditions with torque $T_j \in \mathcal{T} = \{0.0, 0.3, 0.5, 0.9, 1.4, 2.0, 2.7, 3.5\}$ in Nm. Therefore, a total of 40 experiments, each under a unique pair of eccentricity level and load, are conducted with operating data collected for further analysis.

To explore the relationship between motor operation features and eccentricity levels, we pre-process original measurements to fit the input of our regression model. For each experiment, we collect torque, time sequences of rotating speed, horizontal acceleration, vertical acceleration, and three-phase current, each of 60 seconds with a sampling rate of $10^4$ Sa/s. To enrich the training and testing dataset, we first segment each time sequence of original 60-second measurements into 12 non-overlapped segments, each of 5 seconds, resulting a total of N=480 datasets for all 40 experiments. Each dataset includes load torque, rotating speed, acceleration time sequence, and three-phase stator current sequences, etc. We then randomly pick half of the 480 datasets for training and the remaining half for testing. Data features of each dataset are extracted with details described as follows.

We calculate the average vibration velocity as one feature, following three steps below.

Integrate the vibration acceleration time series $A_x$ and $A_y$ independently to get the raw vibration velocity time series.

Calculate the cumulative error-caused velocity trend by the moving average method, where the window size is set as 10 samples.

Calculate the average absolute value of the net vibration velocity based on the detrended vibration velocity on horizontal and vertical directions.

FIG. 4A and FIG. 4B show example plots of the acceleration of vibration and speed of vibration, respectively.

As indicated in equation (2), the eccentricity-related stator current components involve the following characteristic harmonics of current spectrum, a. $f_k = f_s + k f_r$, $k = 0, \pm 1, \pm 2$, (12)

where $f_r$ is the rotational frequency. Considering perturbations in the actual rotating speed, we approximate the rotor rotational frequency range $[f_r^{min}, f_r^{max}]$ using the average rotating speed $\overline{\Omega}$ with some tolerance as $$f_r^{min} = (\overline{\Omega} + b_1)/\Omega_0 \times (f_s/p),$$ (13)

$$f_r^{max} = (\overline{\Omega} + b_2)/\Omega_0 \times (f_s/p),$$ (14)

where $\Omega_0$ is the nominal rotating speed, $f_s$ is the supply frequency, p is the number of pole pairs, and $b_1$ and $b_2$ are pre-defined bias terms to amend the overestimation of the tachometer.

Given the three-phase current, we first perform Fast Fourier Transform (FFT) on the current time series of each phase $H^P = FFT(I^P)$, where $P \in \{A, B, C\}$ represents one of the three phases. We then calculate the kth harmonic components $H_k^P$ of each phase in the following way, where we set the maximum harmonic order $k_0 = 98$ and tolerance band $\Delta f$ as 1.5 Hz.

$$H_k^P = \max(H^P(f)|f_k^{min} \leq f \leq f_k^{max}),$$ (15)

where $$f_k^{min} = f_s + k f_r^{min} - \Delta f,$$

$$f_k^{max} = f_s + k f_r^{max} + \Delta f,$$

$k = -1, 0, 1, \ldots, k_0$.

Finally, we calculate the magnitude of the eccentricity-related current components $H_k$ by calculating the mean of three phases $$H_k = (H_k^A + H_k^B + H_k^C)/3.$$ (16)

Figure 5B:
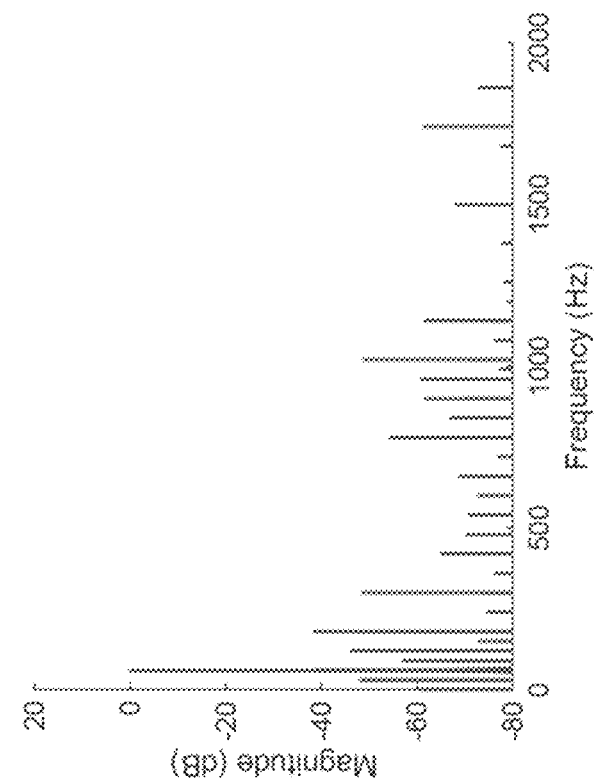
FIG. 5A and FIG. 5B are exemplar plots of accelleration of vibration and the corresponding speed of vibration, respectively.
Figure 5A:
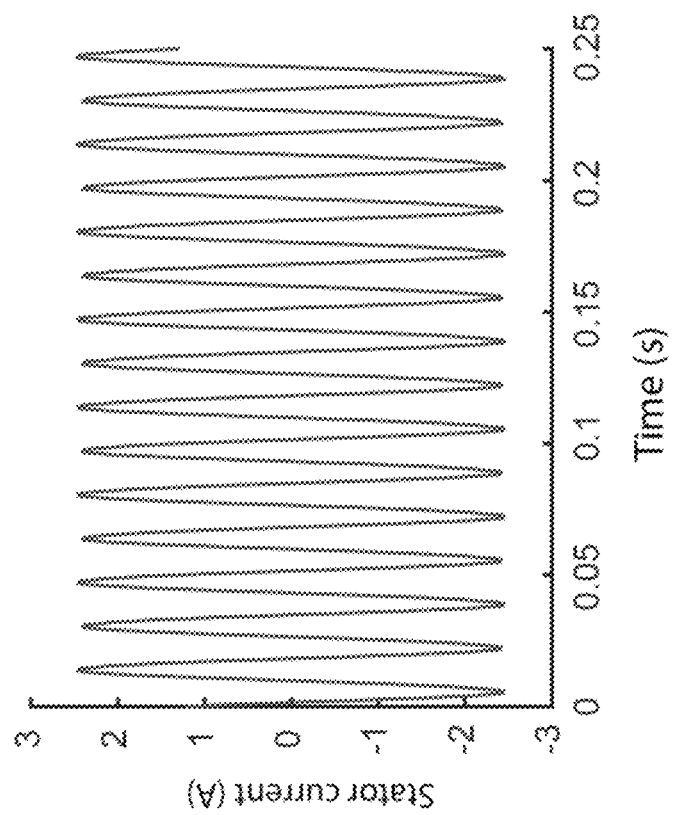

FIG. 5A and FIG. 5B show example plots of the collected time-domain stator current data and its corresponding frequency spectrum, showing a range of rotor frequency harmonics with various magnitudes.

Figures 6A, 6B:
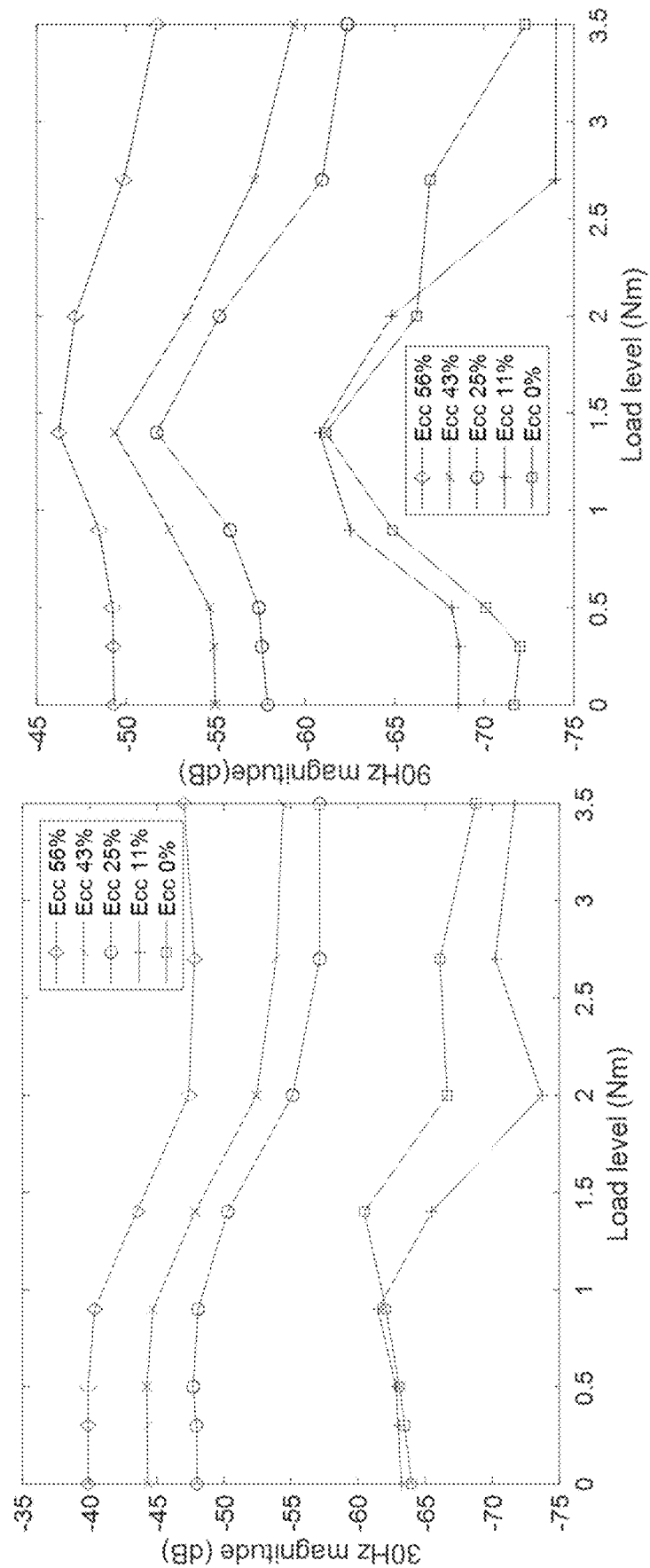
FIG. 6A and FIG. 6B are exemplar plots of 30 Hz frequency component and 90 Hz frequency component at different loads, respectively.

To further explore the harmonic magnitude, we plot in FIG. 6A and FIG. 6B the magnitude of 30 Hz and 90 Hz in current spectrum relative to the 60 Hz operating frequency component with respect to different load conditions. We can observe that the magnitude may vary greatly with load, especially when the eccentricity level is relatively low. Therefore, it is not reliable to estimate the eccentricity severity level according to solely the magnitude of 30 Hz or 90 Hz. It is imperative to incorporate multiple features appropriately to develop an eccentricity severity estimation method.

Consequently, load torque, rotor speed, vibration acceleration, vibration speed, and current spectral features are provided for further model training and testing. In summary, data processing provides vectors of measurements for different experiment settings, including load torque $T = [T_1, \ldots, T_j, \ldots, T_N]^T$ with $T_j \in \mathcal{T}$, rotating speed $\Omega_r$, horizontal, vertical and total vibration acceleration $A_x$, $A_y$, and $A = \sqrt{A_x^2 + A_y^2}$ respectively, horizontal, vertical and total vibration speed $V_x$, $V_y$, and $V = \sqrt{V_x^2 + V_y^2}$, respectively, and current spectral features $\{H_n\}$, formulated in feature matrix X (eccentricity feature matrix X) as $$X = [T, \Omega_r, A_x, A_y, A, V_x, V_y, V, H_{-1}, H_1, \ldots, H_{k_0}].$$ (17)

Figure 7:
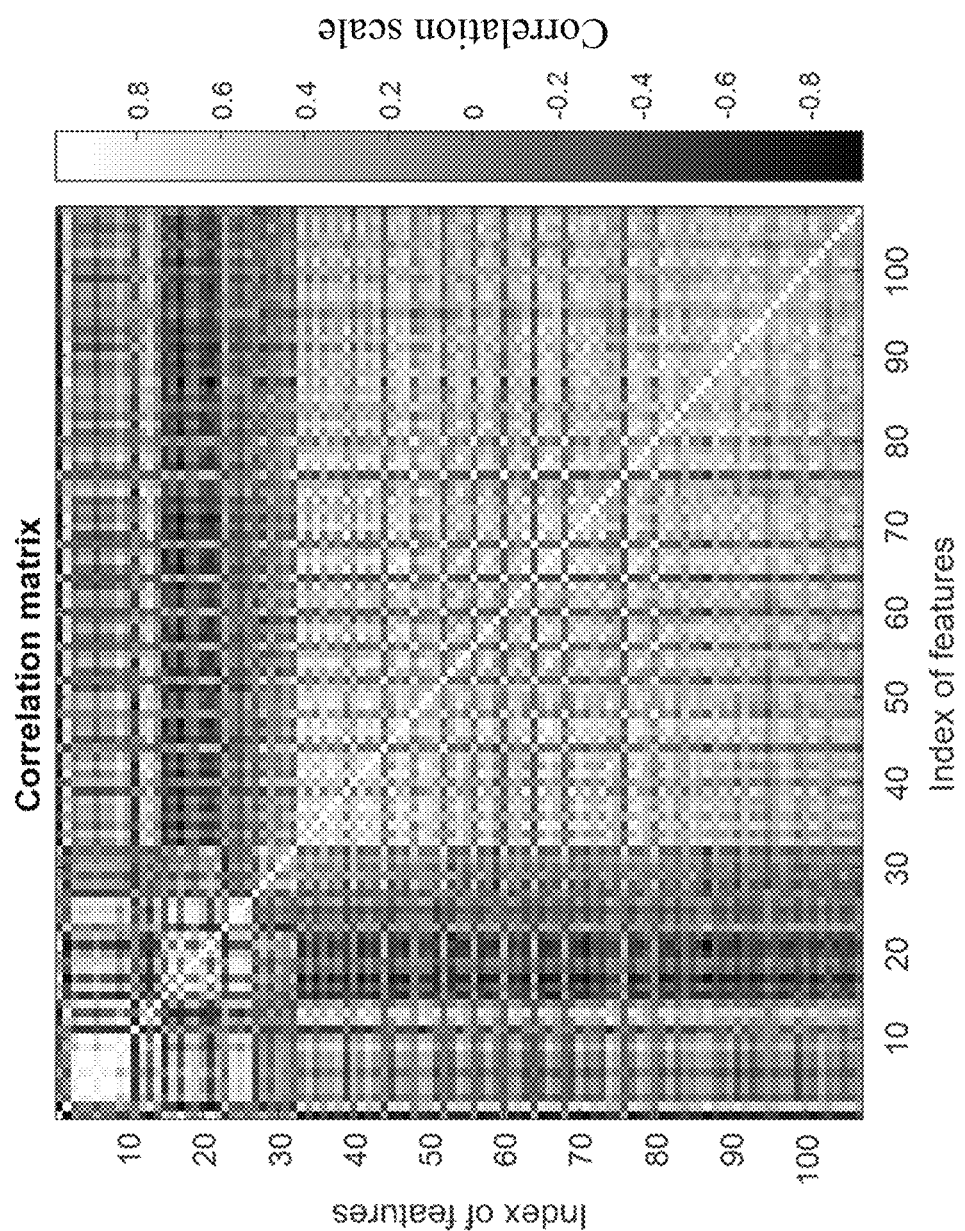
FIG. 7 is an exemplar plot of correlation matrix of features used in training the regression model.

All features are normalized to have zero mean and unit variance to ensure all features are equally weighted without any prior knowledge. An exemplar plot of the feature correlation matrix is shown in FIG. 7.

Figure 8:
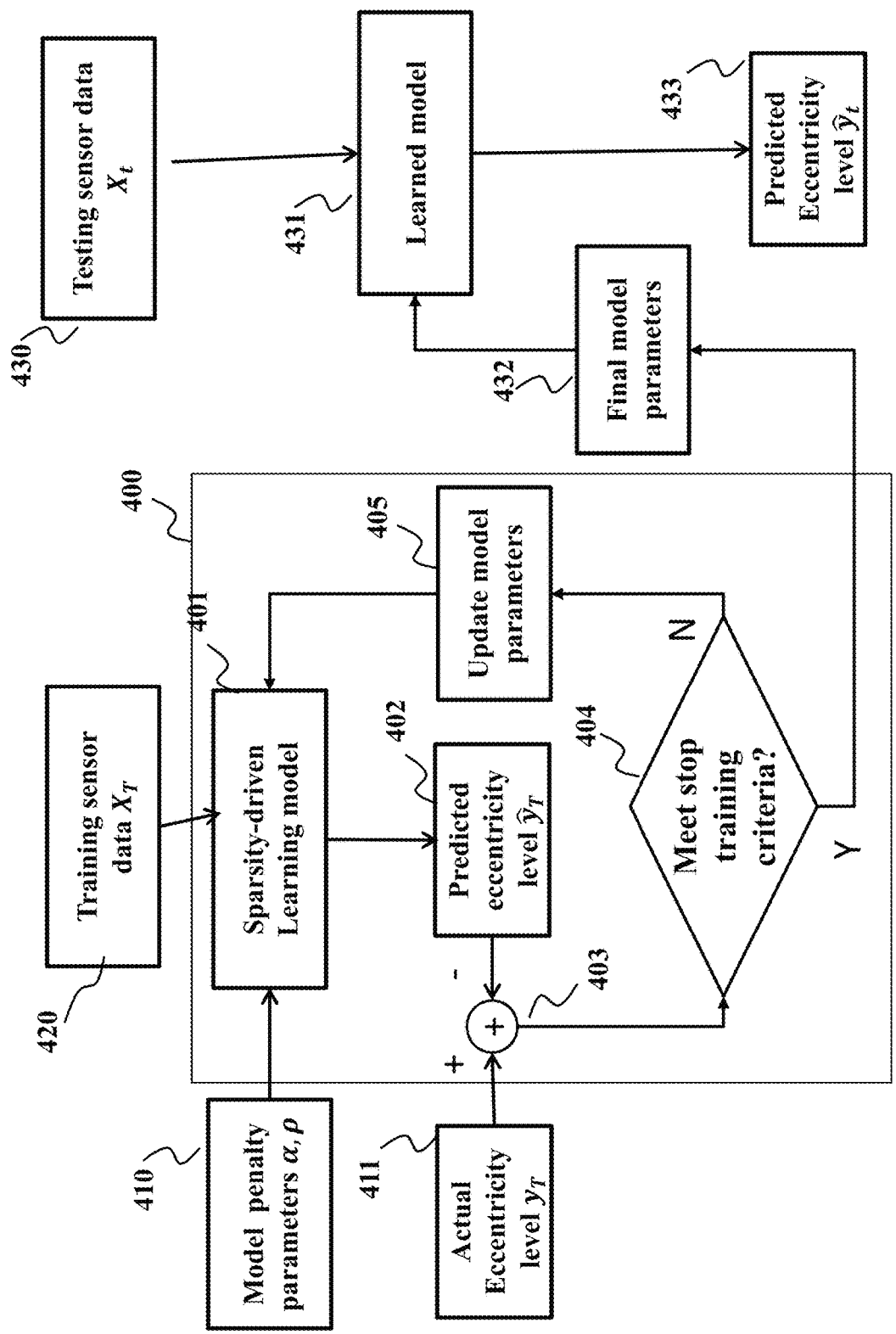
FIG. 8 is a block diagram of a method for training a learning-based detecting eccentricity method (model) in the induction motor according to one embodiment of the invention.

FIG. 8 shows a block diagram of a method for training a learning-based detecting eccentricity method (fault severity detection method) in the induction motor according to one embodiment of the invention.

Given training sensor data $X_T$ 420, the sparsity-driven learning model 401 will learn the weights on features (model parameters) 401 given preset model penalty parameters $\alpha$ and $\rho$ 410 according to algorithm 1 of FIG. 9. Once the error between predicted eccentricity level $\hat{y}_T$ 402 and the actual eccentricity level $y_T$ 411 meets the stop training criteria, for example smaller than a preset threshold, or the total number of iterations reaches the preset maximum iteration number, the final model parameters 432 will be included in the trained model 431 to predict eccentricity level $\hat{y}_t$ 433 given testing sensor data $X_t$ 430. Otherwise, the learning model will update model parameters 405 and re-predict eccentricity level $\hat{y}_T$ 402 until the error meets stop training criteria.

We implement Algorithm 1 of FIG. 9, with the pre-defined parameter $\alpha = 10$, $\rho = 10$, initial values $\mu_0 = 0$, $z_0 = 0$, and the maximum number of training iterations $n_{iter} = 10^3$.

Figure 10:
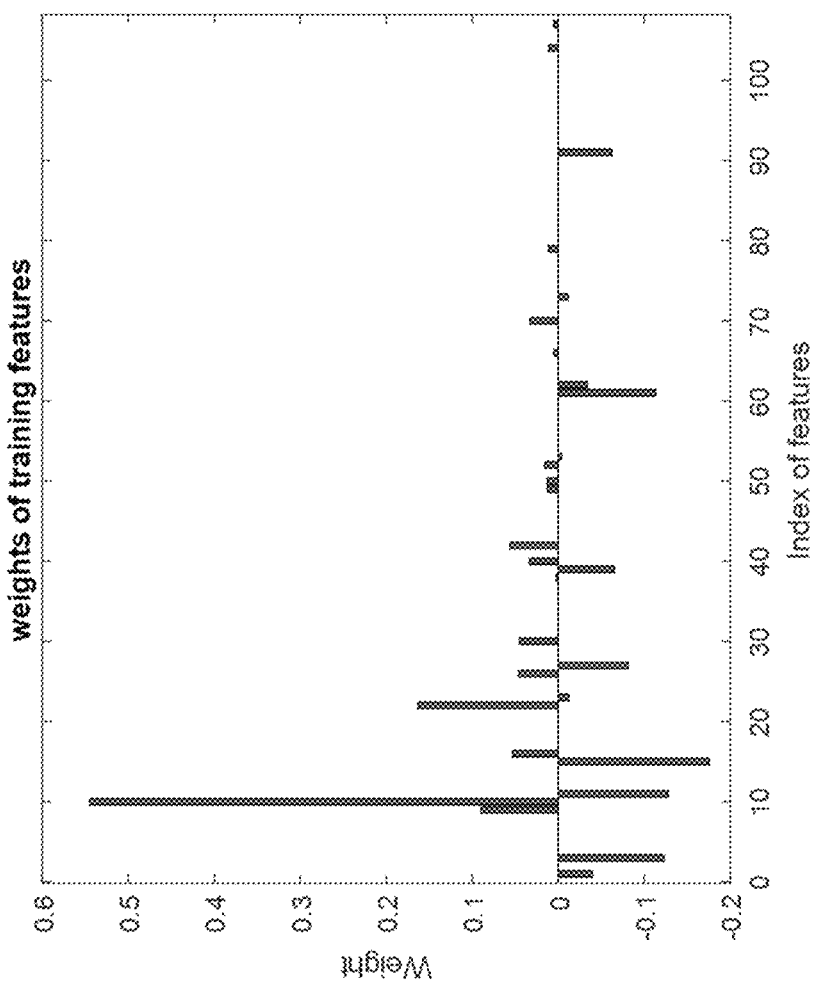
FIG. 10 is an exemplar plot of feature weights after in trained regression model.

A plot of the sparse weights learned from our training data is shown in FIG. 10. We notice that 90 Hz frequency component plays a dominant role in the severity level estimation. Besides the 90 Hz frequency component, other features such as vibration and some high order harmonics also contribute to the final estimation. This agrees with literatures that use vibration and high-order harmonics for eccentricity detection.

Figure 11:
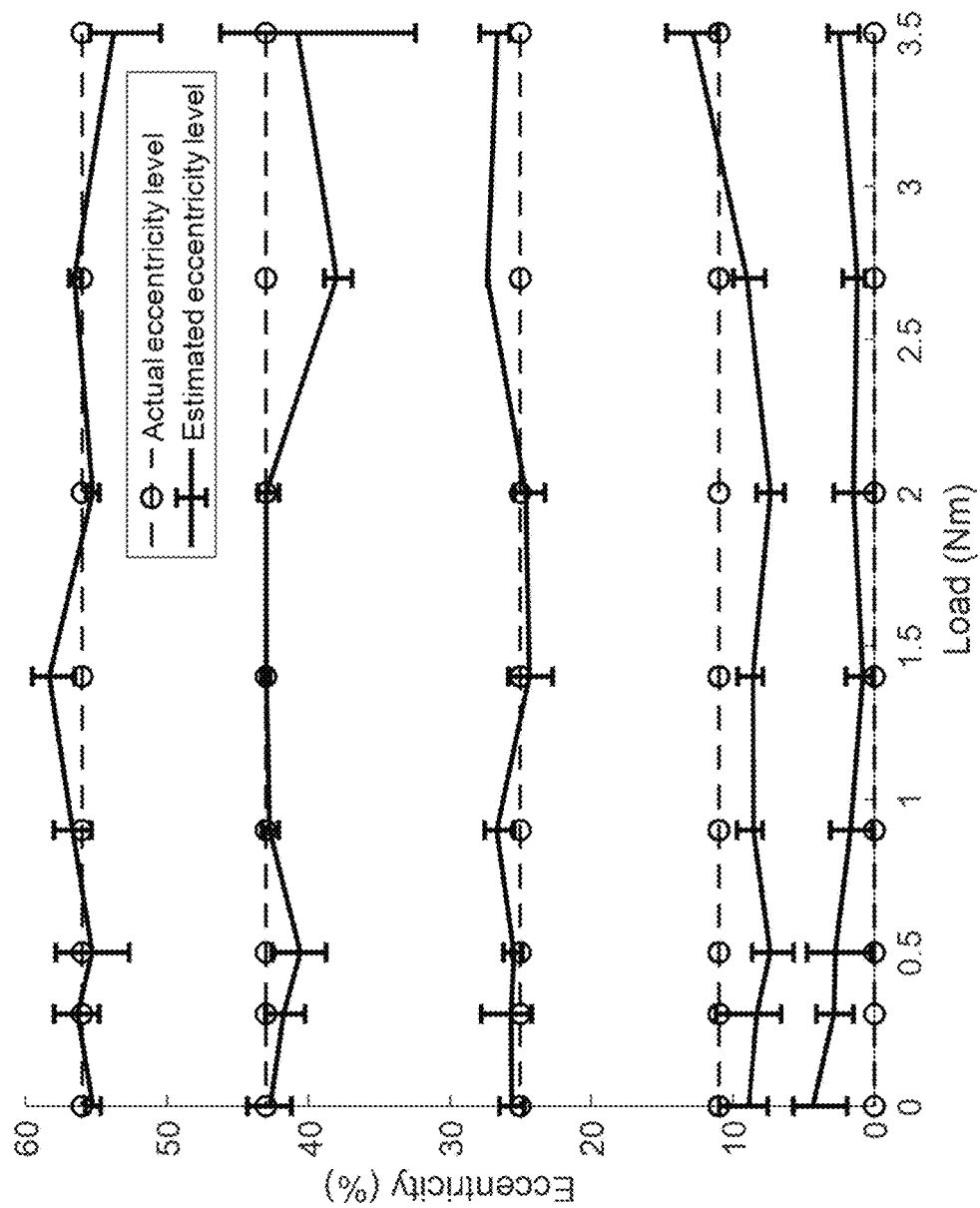
FIG. 11 is an exemplar plot of predicted eccentricity severity levels with comparison to the true eccentricity levels.

The estimation results on the test dataset using trained model as well as the true eccentricity severity levels are shown in FIG. 11. We observe that our estimates of eccentricity levels match the true eccentricity setup well across all different load conditions.

To quantify the model performance, we take the coefficient of determination as the accuracy metric, which can be calculated as $$R^2 := 1 - \frac{\sum_i (y_i - \hat{y}_i)^2}{\sum_i (y_i - \overline{y})^2},$$ (18)

where $y_i$ represents the real value of the ith sample, $\hat{y}_i$ represents the estimated value, and $\overline{y}$ represents the mean of real values of all samples. We achieve the coefficient of determination value $R^2 = 0.981$, which is very close to the ideal value 1 when all estimates are the same as the corresponding true eccentricity levels.

Based on the training procedure described above, some embodiments can provide an artificial intelligence (AI) training system for learning the weights stored in the memory of the apparatus described above. In this case, the apparatus is provided for estimating a severity level of an eccentricity of an induction motor, and include an input interface configured to accept values of a set of parameters of a state of an operation of the induction motor at different time steps via a network, a memory configured to store a set of weights learned for the set of parameters of the operation of the induction motor from training data with machine learning subject to sparsity constraints, a processor configured to determine the severity level as a weighted combination of the values of the set of parameters accepted at a time step and weighted with corresponding weights retrieved from the memory, wherein the processor uses the same weights for the set of parameters accepted at the different time steps, and an output interface configured to render the determined severity level.

The AI training system is configured to include a training processor and a training memory. The training memory having instructions stored thereon that cause the training processor to collect training data indicative of measurements of a plurality of parameters including the set of parameters paired with a labeled value of the severity level, train the set of weights for the weighted combination of the plurality of parameters reducing a loss function including a difference of a severity level estimated with current weights and the labeled value subject to the sparsity constraints, and submit the weights to the apparatus over one or a combination of wired and wireless communication channels.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. A fault detection system for an induction machine including a rotor and stator, comprising:
    a sensor interface configured to acquire sensor signals from multiple types of sensors, wherein the sensor signals are indicative of operational parameters of the induction machine;
    a memory configured to store instructions implementing a sparsity-driven regression model for the induction machine, wherein the sparsity-driven regression model is trained for predicting an eccentricity level of the induction machine; and
    a processor configured to execute the instructions to:
        generate an eccentricity feature matrix for the induction machine based on the sensor signals;
        determine the eccentricity level of the induction machine based on the-eccentricity feature matrix and the sparsity-driven regression model;
        generate one or more control commands based on the determined eccentricity level; and
        control the induction machine based on the generated one or more control commands.

2. The fault detection system of claim 1, wherein the eccentricity level is defined in terms of operating conditions of the induction machine, wherein the operating conditions include load applied to the induction machine, rotating speed of the rotor, vibration, and current spectral feature of the stator.

3. The fault detection system of claim 1, wherein the sensor interface is configured to acquire the sensor signals iteratively for a predetermined time period.

4. The fault detection system of claim 2, wherein eccentricity-associated frequency domains of the current spectral feature are determined at approximately a half of an operation frequency of the induction machine and approximately one and a half of the operation frequency.

5. The fault detection system of claim 4, wherein the current spectral feature corresponds to a 90 Hz frequency component.

6. The fault detection system of claim 1, wherein the sensors include gap sensors and acceleration sensors.

7. The fault detection system of claim 1, wherein all elements of the eccentricity feature matrix are normalized to have mean and unit variance.

8. The fault detection system of claim 1, wherein the fault detection system is included as part of a maintenance system of a user.

9. The fault detection system of claim 1, wherein when the determined eccentricity level of the induction machine is equal to or greater than a critical threshold level, the processor is configured to transmit a control signal to a controller of the induction machine via a network to stop operating the induction machine.

10. A computer implemented method for controlling an induction machine, comprising:
    acquiring measurements indicative of operational parameters of the induction machine;
    generating an eccentricity feature matrix for the induction machine based on the measurements, wherein the eccentricity feature matrix comprises a plurality of parameters of a state of an operation of the induction motor;
    determining an eccentricity level of the induction machine based on the eccentricity feature matrix and a sparsity driven regression model that is trained for predicting the eccentricity level of the induction machine;
    generating one or more control commands based on the determined eccentricity level; and
    controlling the induction machine based on the generated one or more control commands.

* * * * *